United States Patent
Freund et al.

Patent Number: 6,024,782
Date of Patent: Feb. 15, 2000

[54] LAYERED GAS FILTER MEDIA

[75] Inventors: Andre Freund, Lübeck; Klaus Ammann, Sereetz; Gerhold Mühmel, Hamberge, all of Germany

[73] Assignee: Drägerwerk AG, Lübeck, Germany

[21] Appl. No.: 09/064,572

[22] Filed: Apr. 22, 1998

[51] Int. Cl.[7] .................................................. B01D 53/04
[52] U.S. Cl. ...................... 96/154; 55/524; 55/DIG. 5; 96/135; 427/202; 427/244; 428/408
[58] Field of Search ............................. 55/514, 518, 524, 55/DIG. 5; 96/135, 153, 154; 156/192, 264, 276; 427/202, 244; 428/408

[56] References Cited

U.S. PATENT DOCUMENTS

| | | | |
|---|---|---|---|
| 2,038,071 | 4/1936 | Wilhelm | 96/153 X |
| 3,019,127 | 1/1962 | Czerwonka et al. | 96/153 X |
| 3,484,322 | 12/1969 | Inskeep | 96/154 X |
| 3,664,095 | 5/1972 | Asker et al. | 96/154 |
| 3,702,049 | 11/1972 | Morris, Jr. | 96/154 X |
| 4,227,904 | 10/1980 | Kasmark, Jr. et al. | 55/498 X |
| 4,484,938 | 11/1984 | Okamoto et al. | 96/154 X |
| 4,510,193 | 4/1985 | Blücher et al. | 96/154 X |
| 5,069,694 | 12/1991 | Cullen et al. | 96/154 |
| 5,304,419 | 4/1994 | Shores | 96/154 X |
| 5,338,340 | 8/1994 | Kasmark, Jr. et al. | 96/135 |
| 5,350,443 | 9/1994 | von Blücher et al. | 55/524 X |
| 5,395,428 | 3/1995 | von Blücher et al. | 96/154 X |
| 5,486,410 | 1/1996 | Groeger et al. | 55/524 X |
| 5,603,753 | 2/1997 | Krull et al. | 96/154 X |
| 5,616,169 | 4/1997 | de Ruiter et al. | 96/153 X |
| 5,807,424 | 9/1998 | de Ruiter et al. | 96/154 X |

FOREIGN PATENT DOCUMENTS

| | | | |
|---|---|---|---|
| 00 69 323 | 1/1983 | European Pat. Off. | |
| 63-214318 | 9/1988 | Japan | 96/154 |
| 2-119907 | 5/1990 | Japan | 96/153 |
| 4-104811 | 4/1992 | Japan | 96/154 |

*Primary Examiner*—Robert H. Spitzer
*Attorney, Agent, or Firm*—McGlew and Tuttle, P.C.

[57] ABSTRACT

A gas filter media with a parallel layer structure, which comprise individual layers of adhesive and adsorbent particles, wherein the thermoplastic adhesive is solvent-free and is preferably based on polypropylene or polyethylene. Using the manufacturing process according to the present invention, it is possible to intentionally prepare gas filter media with adjustable packing density and pressure drop. The gas filter media according to the present invention can be used in respirator filters, room air filters, in ventilation filters for vehicles, or in apparatus filters.

16 Claims, 1 Drawing Sheet

LAYERED GAS FILTER MEDIA

FIELD OF THE INVENTION

The present invention pertains to layered gas filter media consisting of an adhesive and adsorbent particles.

BACKGROUND OF THE INVENTION

The use of granular adsorbent materials for gas filtration has been known for a long time. Adsorbent materials are used for this purpose as so-called bulk bed filters in a housing.

The drawback of these bulk bed filters is that the adsorbent particles are packed densely, which leads to a relatively high pressure drop during the flow of the gas through them, especially if finer granular adsorbent materials are used. An additional drawback of bulk bed filters arises from the fact that the filter housing, which usually imitates simple geometric shapes, such as cylinders or parallelepipeds, has a preset geometry for manufacturing technical reasons. To avoid the drawbacks of bulk bed filters, it is therefore desirable to have a possibility of adjusting the packing density of the adsorbent packing as needed, on the one hand, and, on the other hand, to generate a structure of the gas filter media that can be flexibly adapted to different geometries corresponding to the intended use or the site of use. It has been known in this connection that shaped adsorbent structures can be formed by mixing adsorbent particles with an adhesive and a subsequent exposure to temperature and subsequent shaping. The drawback of such structures is that their packing density is relatively high and it comes rather close to that of bulk bed filters, so that the pressure drops associated with it are too high for some applications. On the other hand, to obtain filter structures with especially low pressures drops, it was suggested that support structures, which have only a low air resistance, be provided with adsorbent particles by means of suitable adhesives. The adsorbent structures thus obtained have the drawback that besides the adsorbent particles and the adhesive, which are the indispensable components, they also contain the support structure, which is undesirable for cost reasons and is disadvantageous for the overall efficiency of the filter material.

Thus, a layered filter mat for kitchen range hoods has become known from EP 00 69 323 A1. A granular filter layer consisting of activated carbon or the like is introduced there between porous and flexible cover webs, preferably nonwoven fabrics, and is connected to the cover webs by means of an adhesive.

SUMMARY AND OBJECTS OF THE INVENTION

The primary object of the present invention is to provide, while abandoning an additional support or cover material, gas filter media that consist of an adhesive and adsorbent particles only and that have, due to the corresponding manufacturing process, an effective possibility of setting lower or higher packing densities and consequently lower or higher pressure drops of the filter material.

According to the invention, a layered gas filter media is provided consisting of an adhesive and adsorbent particles. The gas filter media includes at least one network-like, two-dimensional layer of a thermoplastic adhesive with at least one layer of adsorbent particles, which is strewn onto the adhesive layer and is fixed thereon.

The layered gas filter media preferably has up to 50 layers of adsorbent particles or layers of adhesive and that the size of the adsorbent particles is 0.05 to 3 mm. The thermoplastic adhesive may be solvent-free and may be based on polyolefins, especially on polypropylene or polyethylene. The adsorbent particles may consist of activated carbon, hopcalite, aluminum oxide, silica gel, zeolite, or hydrophobic molecular sieves. Each layer may advantageously consist of adsorbent particles consisting of different materials and/or of different particle size fractions. Normally, according to the preferred embodiment of the invention, each layer of adsorbent particles consists of the same material, preferably of activated carbon particles of a size of 0.05 to 3 mm.

According to another aspect of the invention, a process for preparing layered gas filter media is provided including spraying thermoplastic adhesive with a spraying means onto a substrate moving relative to the spraying means. A network-like layer of sticky adhesive thus formed is coated immediately thereafter with a layer of adsorbent particles applied from a metering device.

Multilayered gas filter media are preferably prepared by repeating the process steps of adhesive spraying and the metering of adsorbent particles several times. Pressure is preferably applied to the layered gas filter media by means of adjustable rolling or pressing means in a further process step in order to increase the packing density of the gas filter media prepared, wherein the pressure is applied within the pot life of the adhesive.

The packing density and the pressure drop of the gas filter medium are preferably intentionally reduced by increasing the relative velocity of the substrate during the metering of the adsorbent particles and/or by reducing the rate of metering of the adsorbent particles.

A further process is provided for using a layered gas filter media provided consisting of an adhesive and adsorbent particles with the gas filter media including at least one network-like, two-dimensional layer of a thermoplastic adhesive with at least one layer of adsorbent particles, which is strewn onto the adhesive layer and is fixed thereon. The further process uses the filter media as layered gas filter media in filters for respirators, in room air filters, in ventilation filters for vehicles, or in apparatus filters, especially for vacuum cleaners.

The essential advantage of the present invention in terms of costs, ease of handling and variability for setting the packing density and the pressure drop arises from the fact that the gas filter medium according to the present invention comprises only two basic components without support materials, and that the corresponding manufacturing process has simple and effective means of specifically setting the packing density and the pressure drop.

An exemplary embodiment of the present invention will be described below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
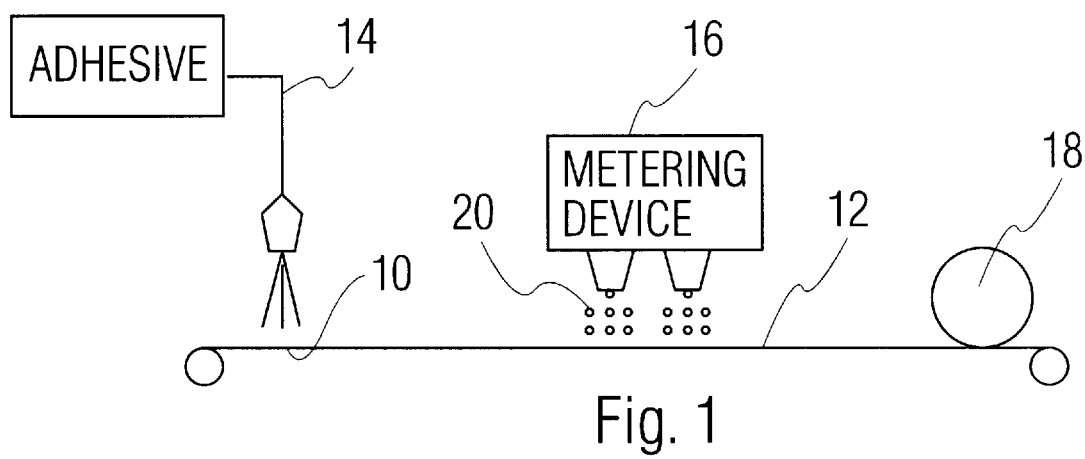
FIG. 1 is a schematic representation of the process according to the invention.

A molten thermoplastic adhesive based on polypropylene is sprayed at 10 onto a flat substrate 24 (see FIG. 2) in the form of a silicone paper-coated conveyor belt 12 via a spraying means 14 (nozzle opening 0.2 to 1.0 mm, especially 0.3 to 0.6 mm). Suitable thermoplastic adhesives according to the present invention are based on polyolefins, especially polypropylene or polyethylene, are solvent-free, have a softening point of 120° C. to 180° C., a flash point according to DIN 51758 exceeding 200° C., and an ignition point exceeding 250° C. The pot life is 10 to 60 sec. The substrate with the silicone paper is moved during the spraying process relative to the spraying means 14, so that the substrate is coated with the thermoplastic adhesive two-dimensionally and in a network-like pattern over an adjustable width.

According to the invention, different possibilities exist for creating a network-like structure of the adhesive material. The preferred method may include either of two possibilities. In each case, a substrate, preferably a silicone paper-coated conveyor belt 12 or a fleece or web of commercial fibers on the belt 12 (further discussed below), is conveyed with a consistent speed in a certain direction (from left to right in FIG. 1). Molten thermoplastic adhesive is sprayed either by several single spraying means 14, which is located above the substrate and moved periodically in a direction laterally (vertically) to the transportation direction of the conveyor belt 12, or a nozzle with a broad nozzle opening is used which will extend over the whole or nearly the whole width of the conveyor belt 12. In this case a movement of the nozzle means is not necessary in view of the large width opening of the nozzle associated with spraying means 14. Upon movement of the conveyor belt 12 the adhesive spray covers the whole area to be treated with a discrete, but irregular pattern of adhesive material. To cover the whole width of the conveyor belt 12, depending on its absolute size, two or more of these broad nozzle opening spray means 14 may be necessary. With use of broad nozzle opening spray means 14 no movement in the direction vertically to the conveyor belt 12 movement is necessary. The spray then covers the area which is to be covered with adsorbent particles, in a subsequent step. This procedure may be repeated once or several times in following downstream process steps, according to the number of layers and thickness of the filter media that is to be provided. It should be noted that FIG. 1 is a schematic showing only and the spray means 14 is shown only to represent the spraying function. Specifically, the dimension of the spray in the longitudinal direction (direction of conveyor belt movement) is preferably much narrower than the dimension of the spray in the width direction, if a single broad nozzle opening is used.

Figure 2:
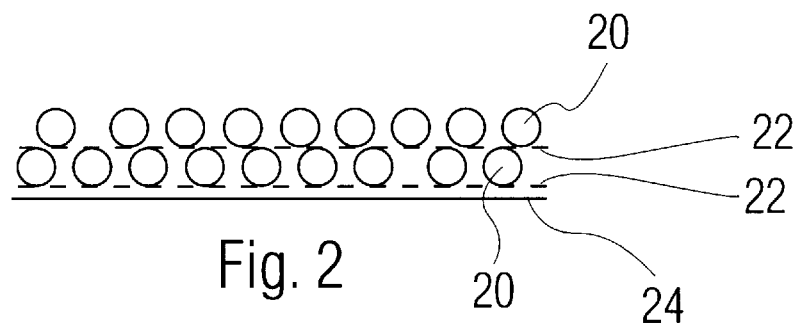
FIG. 2 is a view of the layered gas filter media according to the invention, while the media is still on a support substrate.

Adsorbent particles 20 are applied to the substrate 24 coated with the still sticky thermoplastic adhesive 22 via a metering device 16 in a manufacturing step following immediately, so that they adhere to the adhesive 22. The metering device 16 is shown only schematically in FIG. 1. A trickle section, comprising downpipes arranged at right angles to the substrate with two to six built-in baffles, has proved to be a suitable metering means. Screens or pins of a network-like design, which uniformly distribute the trickling material, so that the most uniform coating possible of the substrate with the adhesive is achieved, are used as the baffles. Mesh sizes or pin distances in the range of 1 to 4 mm are selected, depending on the particle size of the trickling material, i.e., the adsorbent particles. By repeating the process steps of adhesive spraying and the metering of adsorbent particles, a layered, sandwich-like structure can be obtained as shown in FIG. 2, and, besides the number of layers, the composition of the individual adsorbent layers 20 with different materials and specifications can also be selected according to the intended use. The percentage of the adhesive 22 is between 2 and 20 wt. % and preferably between 3 and 12 wt. % relative to the gas filter medium, depending on the material and the embodiment.

The substrate 24 mentioned above may consist of a fleece or a web of typical commercial fibers, especially of polypropylene or polyester. The advantage of these substrate materials is due to better handling characteristics of the gas filter media after their manufacture, as this minimizes the negative impact of loose adsorbent particles.

In the case of the preferred use of activated carbon of a particle size of 10×25 mesh, structures with a height of 15 mm, which have an activated carbon density of 350±25 g/L and a pressure drop of 40±15 Pa at an incoming air velocity of 10 cm/sec if the entire surface of the thermoplast structure is covered with adsorbent particles and a structure consisting of 9 layers is used. The percentage of the adhesive is 5± 1 wt. % relative to the gas filter medium.

Another process step according to the present invention is based on pressure being applied to the layered filter medium, as long as the thermoplastic adhesive is still within its pot life, by means of rolling or pressing means 18 in a direction at right angles to the layer structure in order to prepare adjustable structures with higher packing density and higher pressure drop. Experiments have revealed that pressures of up to 10 N/cm$^2$ can be applied to the filter media. Filter media prepared in this manner are rather compact, but they still have sufficient elasticity to be able to be introduced into arched formations, depending on the site of installation and the intended use of the filter. Activated carbon densities of 450±20 g/L and pressure drops of 230+100 Pa or 230–70 Pa (the higher value results from a relatively more compact material structure when applying higher activated carbon densities—the relationship between change and carbon density and resulting pressure drop change is not always linear) are obtained for such compacted filter media at an incoming air velocity of 10 cm/sec. In addition or as an alternative, it is possible to prepare filter medium webs with adsorbent particles located separately in the surface, which are suitable for applications in which especially high requirements are imposed on the pressure drop, by increasing the relative velocity between the metering means and the substrate and by reducing the amount of adsorbent particles metered per unit of time. Material webs of this type are characterized by a lower packing density. For example, a doubling of the relative velocity between the metering device and the substrate leads to products that contain about 250±30 g/L of activated carbon as the adsorbent material. They have a pressure drop of 8±4 Pa at an incoming flow velocity of 10 cm/sec. The percentage of adhesive is 9±1 wt. % relative to the gas filter medium. All intermediate values between the values indicated can also be embodied by correspondingly selecting the relative velocity and the metering. The number of layers of a material web obtained in one production run can be multiplied by arranging a plurality of webs one on top of another as needed. The use for adsorbing gases in room air filters or in filters for individual, personal respirators may be mentioned, e.g., as suitable possibilities of application. The gas filter materials according to the present invention can be further processed with adsorbent structures into combined gas/particle filter media by a combination with fabric or nonwoven webs. One field of application of such a combined filter material is, e.g., ventilation filters for motor vehicles to retain both gases and particles from the ambient air flowing in.

While specific embodiments of the invention have been shown and described in detail to illustrate the application of the principles of the invention, it will be understood that the invention may be embodied otherwise without departing from such principles.

What is claimed is:

1. A gas filter media comprising:
   an adhesive layer;
   an adsorbent layer of adsorbent particles adhesively attached to said adhesive layer;
   another adsorbent layer adhesively attached to said adhesive layer on a side of said adhesive layer opposite said adsorbent layer, said adhesive layer is directly bound to said adsorbent layer and said another adsorbent layer.

2. The layered gas filter media in accordance with claim 1, wherein:
   up to 50 said layers of adsorbent particles and said layers of adhesive are provided:
   a size of said adsorbent particles is 0.05 to 3 mm.

3. The layered gas filter media in accordance with claim 1, wherein:
   an adhesive of said adhesive layer is a solvent-free thermoplastic and is based on polyolefins.

4. The layered gas filter media in accordance with claim 1, wherein:
   an adhesive of said adhesive layer is a thermoplastic adhesive based on one of polypropylene and polyethylene.

5. The layered gas filter media in accordance with claim 1, wherein said adsorbent particles consist of at least one of activated carbon, hopcalite, aluminum oxide, silica gel, zeolite, and hydrophobic molecular sieves.

6. The gas filter media in accordance with claim 1, further comprising:
   a plurality of said adhesive layers and said adsorbent layers alternately attached to each other.

7. The layered gas filter media in accordance with claim 6, wherein said adsorbent layers are provided with adsorbent particles of different materials and/or of different particle size fractions.

8. The gas filter media in accordance with claim 6, wherein:
   one of said adhesive layers is an outside layer of said plurality of layers.

9. The gas filter media in accordance with claim 1, further comprising:
   another adhesive layer is bound to another side of said another adsorbent layer diametrically opposite said adhesive layer.

10. The gas filter media in accordance with claim 9, wherein:
    said adhesive layer binds said adsorbent layers in a compressible manner to vary a density of said adsorbent particles and vary a pressure drop through said layers by compression of said layers.

11. The gas filter media in accordance with claim 1, wherein:
    said adhesive layer forms a discrete and irregular pattern of adhesive material;
    said adhesive layer and adsorbent layer have an elasticity to be formable into arched formations.

12. A process for preparing layered gas filter media, comprising the steps of:
    providing at least one network, two-dimensional layer of a thermoplastic adhesive by spraying a thermoplastic adhesive with a spraying means onto a layer of adsorbent particles moving relative to the spraying means to form a network layer of sticky adhesive; and
    coating the layer of adhesive immediately thereafter with another layer of adsorbent particles applied from a metering device such that the adsorbent particles are strewn onto the adhesive layer and fixed thereon.

13. The process in accordance with claim 12, further comprising forming a multilayered gas filter media by repeating the process steps of adhesive spraying and the metering of adsorbent particles several times to form the multilayered gas filter media.

14. The process in accordance with claim 12, wherein pressure is applied to the layered gas filter media by means of adjustable rolling or pressing means in a further process step in order to increase the packing density of the gas filter media prepared, wherein the pressure is applied within the pot life of the adhesive.

15. The process in accordance with claim 12, wherein a packing density and a pressure drop through the gas filter medium are intentionally reduced by increasing the relative velocity of the substrate during the metering of the adsorbent particles and/or by reducing the rate of metering of the adsorbent particles.

16. The process according claim 12, further comprising: using the filters for respirators, in room air filters, in ventilation filters for vehicles, or in apparatus filters, especially for vacuum cleaners.

* * * * *